Nov. 14, 1967  W. V. THELANDER  3,352,393
FRICTION CLUTCH
Filed Jan. 7, 1966  2 Sheets-Sheet 1
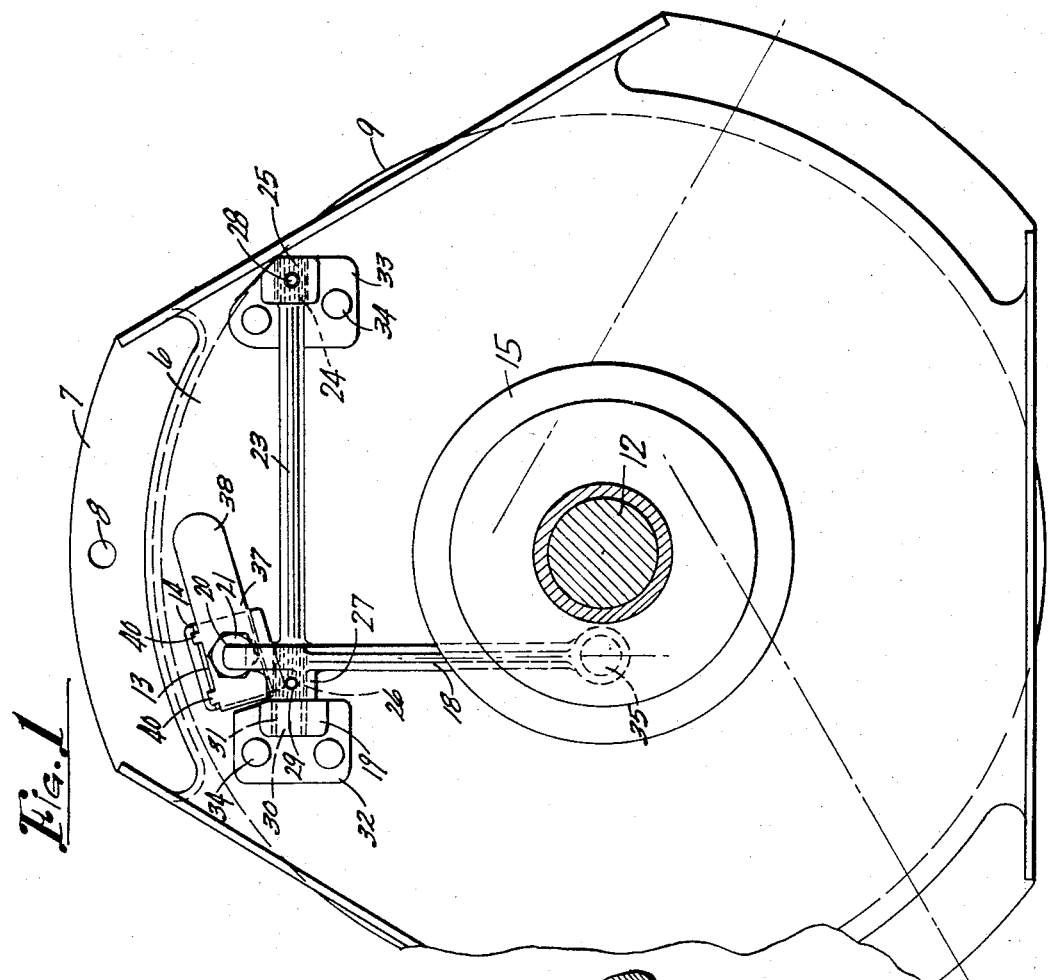
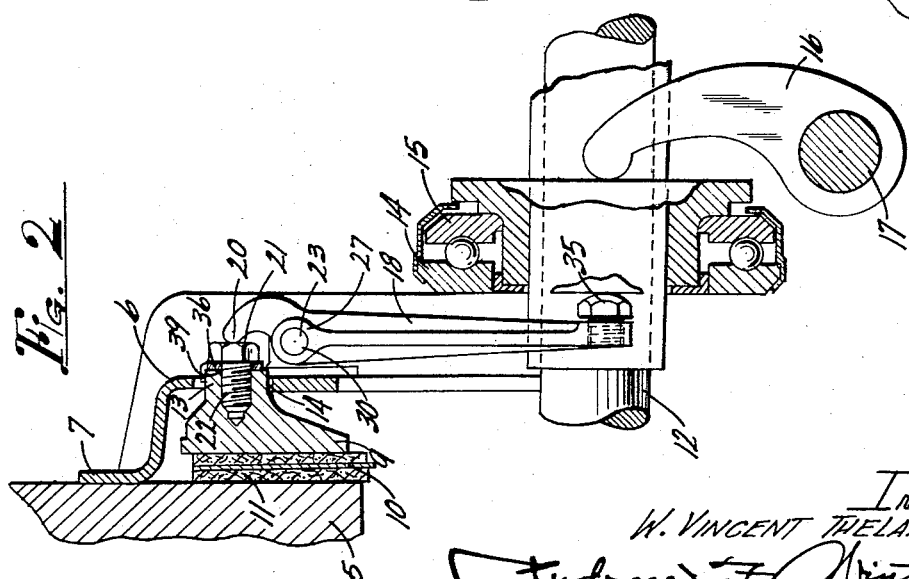
INVENTOR
W. VINCENT THELANDER
ATTORNEY

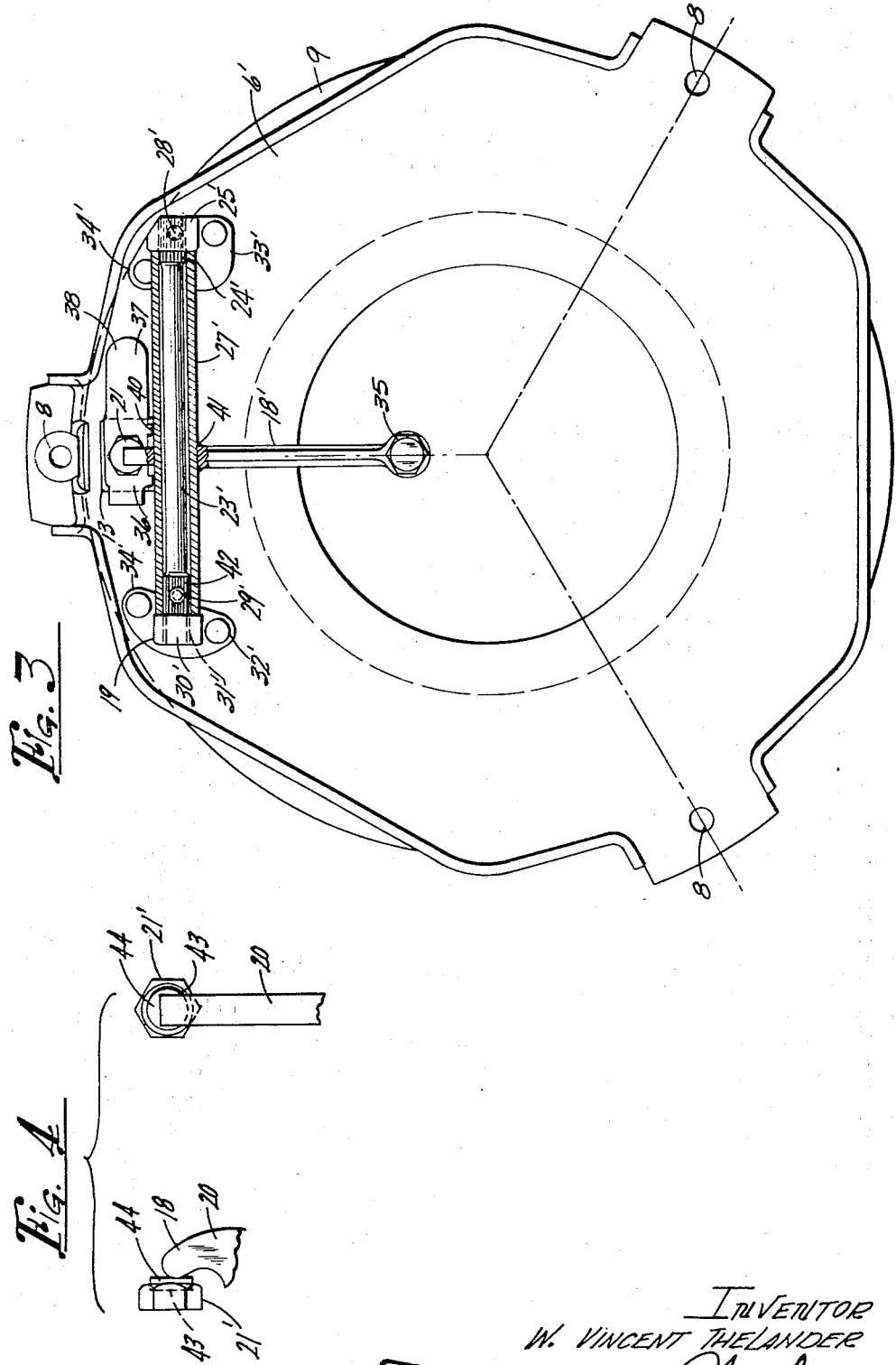

United States Patent Office 3,352,393
Patented Nov. 14, 1967

3,352,393
FRICTION CLUTCH
W. Vincent Thelander, Cave Creek, Ariz. 85331
Filed Jan. 7, 1966, Ser. No. 519,361
10 Claims. (Cl. 192—68)

This invention relates to friction clutches, and is more particularly concerned with an improved design whereby the usual coiled compression springs caged between the pressure plate and back plate holding the clutch engaged are dispensed with by virtue of the novel use of a suitably loaded torsion bar incorporated in each of the release levers in such a novel way that the torsion bar serves both as a pivot pin for mounting the lever on the back plate and as a torsion bar.

A further novel feature of the present clutch is the setting of all of the release levers cocked at the same acute angle in relation to the back plate with the torsion bars free of twist up to the time that the back plate is bolted in place on the back of the fly-wheel with the heads of adjusting screws on the drive lugs of the pressure plate bearing against the outer ends of the release levers to wind up or twist all of the torsion bars alike as the back plate is bolted into place. Hardened discs set in recesses in the heads of the adjusting screws can be replaced by thicker ones when the clutch disc facings show enough wear to warrant making such compensation.

Another novel feature is the employment of a leaf spring fixed to each of the drive lugs on the pressure plate under the head of the adjusting screw and extending laterally from said lug for engagement on the back of the back plate, these springs serving not only to return the pressure plate to retracted position when the release levers are oscillated by the throwout bearing to released position but also simplifying shipping by serving to retain the pressure plate and likewise facilitating ultimate assembling of the clutch on the fly-wheel.

The invention is illustrated in the accompanying drawing, in which—

FIG. 1 is a rear view of a friction clutch embodying my invention, showing only one release lever with its accompanying torsion bar, the location for two others 120° apart being indicated only by dot and dash center lines, it being understood, however, that four of these levers may be used;

FIG. 2 is a section on the line 2—2 of FIG. 1;

FIG. 3 is a view similar to FIG. 1 showing a modified or alternative construction, and FIG. 4 shows the head of one of the adjusting screws in side elevation and rear elevation with a wear compensating disc of hardened metal inserted in a recess provided therefor in the head replacing one of smaller thickness originally embodied, so as to permit compensating for wear on the clutch plate facings without adjusting the screws and disturbing their relationship to the return springs Similar reference numerals are applied to corresponding parts throughout these views.

Referring to the drawing, the reference numeral 5 designates a portion of a fly-wheel onto the back of which the back plate 6 is bolted by its flanges 7 in the usual way through holes 8 spaced 120° apart. 9 is the pressure plate, and 10 is the clutch plate with the usual friction facing pads 11 applied to the opposite sides thereof, whereby to transmit drive to a driven shaft 12 in the usual way when the clutch is engaged. Heretofore, as shown for example, in my Patent No. 2,214,780, the pressure plate 9 was urged toward the flywheel by a plurality of coiled compression springs caged between the release levers and the back plate. In other clutches, the springs were caged between the back plate and the pressure plate. The rearwardly projecting drive lugs 13 on the pressure plate extend through holes 14 in the pressure plate with a working fit, and these were heretofore in the other clutches arranged to be pulled rearwardly against the action of the coiled compression springs by lever action to release the clutch, the levers being so pivoted relative to the back plate and connected to the lugs and disposed radially with respect to the clutch for operation simultaneously by a central release or throwout bearing 15 to retract the pressure plate and release the clutch when a fork, comparable to that shown at 16, was oscillated in response to depression of the clutch pedal (not shown), operatively connected through intermediate linkage with the shaft 17, to which the fork 16 is secured. In the present clutch, however, the levers 18, which are pivoted at 19 intermediate their ends on the back plate 6, and have their outer ends 20 rounded and engaging the flat heads of the adjusting screws 21 that are threaded in the lugs 13, as shown at 22, have torsion bars 23 providing the spring loading for the levers 18. These bars are twisted between the splined end 24, that is fixed to a bracket 25 secured to the back plate, and the splined other end portion 26 that is secured to the hub portion 27 on one side of the lever 18, the amount of twist in the bar 23 and the consequent spring pressure obtainable being predetermined by the acute angle of cocking of all of the levers 18 with respect to the plane of the back plate 6 before the back plate is bolted to the flywheel. Then, when the back plate is bolted to the flywheel, the lugs 13 are crowded rearwardly relative to the back plate as the back plate is bolted into place, giving the same predetermined amount of angular movement to the outer ends 20 of all of the levers 18 to wind up or twist all of the torsion bars 23 through the the same angle for equal spring pressure at each of the three or four levers employed. Thus, for example, a twist of approximately 19½° gives 250–270 ft. lbs. of torque. Pins 28 and 29 entered in registering holes serve to secure the opposite end portions of each torsion bar to the bracket 25 and hub 27, respectively. Each torsion bar 23 by virtue of its smooth end portion 30 received in an Oilite bearing 31 in the bearing 19 next to the hub 27 serves the double purpose of a pivot pin for the release lever 18 and spring loading of the lever to transmit spring pressure to the pressure plate 9. The bearing 19 and bracket 25 both have pad portions 32 and 33, respectively, riveted to the back plate, as indicated at 34. The inner ends of the levers 18 have screws 35 threaded therein and adjustable relative to the throwout bearing 15 for one adjustment in this clutch, the other adjustment being provided by the screws 21 to compensate for wear of the facings 11, it being manifest that the amount of spring pressure available in the torsion bars to hold the clutch engaged will be diminished appreciably if there is appreciable wear on the facings. The screws 21 in addition to providing the wear compensating adjustment, serve as fasteners for one end 36 of the return springs 37, their other ends 38 projecting forwardly and bearing against the back of the back plate 6. These are flat leaf springs and each has a hole 39 provided in the fastened end to receive the screw 21 while lugs 40 are provided along one longitudinal edge to engage the adjacent side of the drive lug 13 to hold the spring against turning relative to the lug about the screw as a center.

In operation, the leaf springs 37, during shipment of a clutch, retain the pressure plate 9 in assembled relation to the back plate 6, the end portion 38 of each of these springs being bent inwardly toward the back plate. When the clutch is being assembled, the levers 18 are all cocked to the same acute angled relationship with respect to the back plate 6 with a view to the same amount of windup or twist of the torsion bars 23 when the clutch is subsequently assembled on the fly-wheel. In assembling the clutch on the fly-wheel, as the bolts extending through the holes 8 are tightened, the pressure plate 9 is forced rearwardly relative to the back plate and the torsion bars 23 are thereby twisted to the predetermined extent required for good clutch performance. Screws 35 will require some adjustment to have all of the levers 18 be disposed in the same relationship to the throwout bearing 15. The clutch is normally engaged. It is disengaged by depression of the clutch pedal, forcing the throwout bearing forwardly under action of fork 16 to twist the torsion bars 23 a bit farther in order to back the curved outer ends 20 of the levers away from the heads of screws 21 on which they normally bear. Return springs 37 retract the pressure plate 9 simultaneously. As soon as the operator takes his foot off the clutch pedal, the clutch is engaged again under the same spring pressure as before. When the facings 11 show appreciable wear, the screws 21 are backed up a few turns to compensate for this wear and at the same time wind up or twist the torsion bars 23 to their original loading. The springs 37 are usually not seriously affected by such adjustment of the screws because they have sufficient loading to still perform their return function satisfactorily, and, being always under sufficient stress, they will not rattle.

Referring to FIG. 3, which shows a modified or alternative construction, the release levers 18' in this form are disposed radially with respect to the clutch by virtue of the employment of torsion tubes 27', to which the release levers are welded, as at 41, near the middle thereof, in lieu of being fastened in the hub portion 27 shown in FIG. 1 integral with one side of the release lever 18, the tube 27' in this form having one end of the torsion bar 23' connected thereto by its splines 42 and pin 29', while the other end of the torsion bar 23' is splined as at 24' for connection with the bracket 25', a pin 28' being also provided for interconnection of these two interfitting parts. The smooth end portion 30' of the torsion bar 23' is rotatable in an Oilite bearing 31' provided in the bearing bracket 19'. Brackets 19' and 25' have pad portions 32' and 33' riveted to the back plate 6' as at 34'. The construction is otherwise the same as that shown in FIGS. 1 and 2 and corresponding parts have been similarly numbered. The operation of this construction is substantially the same as that of FIGS. 1 and 2.

Referring to FIG. 4, wherein only the rounded outer end portion 20 of a release lever 18 is shown engaging the adjacent head end of an adjusting screw 21', attention is called to the circular recess 43 provided in the head to receive a hardened steel disc or wear resisting plate 44 for abutment with the rounded outer end of the release lever instead of having the latter engage directly on the flat face of the head itself. The purpose of this is not only to reduce wear but enable compensating for wear on the clutch disc facings 11 without the necessity for adjusting the screws 21' to alter the relationship of the heads of these screws to the return springs 37, such compensation being taken care of simply by removal of the back plate 6 or 6' and replacing whatever hardened discs 44 were originally employed and substituting ones of greater thickness to compensate for the wear and consequent loss of spring pressure provided by the torsion bar 23 or 23'.

It is believed the foregoing description conveys a good understanding of the objects and advantages of my invention. The appended claims have been drawn to cover all legitimate modifications and adaptations.

I claim:
1. In a friction clutch comprising a clutch plate adapted to be held in frictional engagement with a fly-wheel, a pressure plate for holding said clutch plate in engaged position, a back plate turning with the fly-wheel having holes provided therein through which drive lugs on the pressure plate project rearwardly, release levers pivoted on the back plate and extending substantially radially inwardly relative thereto, a bearing operatively engaging the inner ends of said levers and disposed centrally relative to said clutch and mounted for axial movement to and from clutch engaging position, and a fork engaging said bearing on diametrically opposite sides and oscillatable to transmit movement thereto, the improvement which consists in pivoting said levers on the back plate inwardly from their outer ends and arranging the same so that their outer ends apply spring pressure to said pressure plate through said drive lugs from a source of spring pressure disposed outside said clutch, a preloaded torsion bar disposed in transverse relation to each of said release levers serving both as a pivot pin for said lever and as the outside source of spring pressure active through said release lever to transmit spring pressure through the outer end thereof to the pressure plate, and means connected with said fork to transmit movement through said bearing to the inner ends of said release levers to disengage said clutch.

2. A friction clutch as set forth in claim 1 wherein each torsion bar is elongated and has one end portion fixed to said release lever and extending beyond said release lever into a bearing provided on the back plate, the major portion of the length of said torsion bar extending from said release lever on the opposite side from said bearing and having its outer end fixed in a support on said back plate, the torsion bar being preloaded by twisting the same between said support and said release lever.

3. A friction clutch as set forth in claim 1 wherein each torsion bar is elongated and has said release lever disposed in transverse relationship thereto intermediate the ends thereof and fixed thereto, one end of said bar being rotatable in a bearing on said back plate, said bar being preloaded by twisting the same from the other end which is fixed in preloaded condition in a support on said back plate.

4. A friction clutch as set forth in claim 1 wherein each torsion bar is elongated and has elongated telescoping and tube and bar elements, the tube element having the release lever disposed in transverse relationship thereto and fixed thereto the bar element having one end of the tube element remote from said lever fixed thereto, one end of said bar being rotatable in a bearing on said back plate, said bar being preloaded by twisting the same from the other end which is fixed in preloaded condition in a support on said back plate.

5. A friction clutch as set forth in claim 1 including return spring means acting between the back plate and said pressure plate to urge said pressure plate to retracted position when said release levers are operated to disengage the clutch.

6. A friction clutch as set forth in claim 1 including return spring means acting between the back plate and said pressure plate to urge said pressure plate to retracted position when said release levers are operated to disengage the clutch, said spring means being in the form of leaf springs of elongated form, one for each of said drive lugs, the same being attached to the drive lug at one end and bearing on the back plate at the other end.

7. A friction clutch as set forth in claim 1 including return spring means acting between the back plate and said pressure plate to urge said pressure plate to retracted position when said release levers are operated to disengage the clutch, said spring means being in the form of leaf springs of elongated form, one for each of said drive lugs, the same being attached to the drive lug at one end and bearing on the back plate at the other end, the clutch further including a screw in each of the drive lugs bearing against the outer ends of the release levers and arranged to be adjusted to compensate for wear on the clutch plate facings, one end of each leaf spring being fastened to a drive lug by a screw.

8. A friction clutch as set forth in claim 1 including return spring means acting between the back plate and said pressure plate to urge said pressure plate to retracted position when said release levers are operated to disengage the clutch, said spring means being in the form of leaf springs of elongated form, one for each of said drive lugs, the same being attached to the drive lug at one end and bearing on the back plate at the other end, the clutch further including a screw in each of the drive lugs bearing against the outer ends of the release levers and arranged to be adjusted to compensate for wear on the clutch plate facings, one end of each leaf spring being fastened to a drive lug by a screw, and the leaf spring having means for preventing turning of the same relative to the screw.

9. A friction clutch as set forth in claim 1 including return spring means acting between the back plate and said pressure plate to urge said pressure plate to retracted position when said release levers are operated to disengage the clutch, said spring means being in the form of leaf springs of elongated form, one for each of said drive lugs, the same being attached to the drive lug at one end and bearing on the back plate at the other end, the clutch further including a screw in each of the drive lugs bearing against the outer ends of the release levers and arranged to be adjusted to compensate for wear on the clutch plate facings, one end of each leaf spring being fastened to a drive lug by a screw, and the leaf spring having means for preventing turning of the same relative to the screw, said means comprising lugs provided on one longitudinal edge portion of the leaf spring engaging the adjacent side of the drive lug.

10. A friction clutch as set forth in claim 1 including return spring means acting between the back plate and said pressure plate to urge said pressure plate to retracted position when said release levers are operated to disengage the clutch, said spring means being in the form of leaf springs of elongated form, one for each of said drive lugs, the same being attached to the drive lug at one end and bearing on the back plate at the other end, the clutch further including a screw in each of the drive lugs having a head securing one end of a leaf spring to the drive lug and having a recess provided therein receiving a removable wear resisting bearing plate for bearing engagement thereon of the outer end of a release lever, said plate being replaceable by one of greater thickness to compensate for wear on the clutch plate.

References Cited

UNITED STATES PATENTS

| | | | |
|---|---|---|---|
| 2,214,780 | 9/1940 | Thelander | 192—68 |
| 2,253,294 | 8/1941 | Higgs | 192—68 X |
| 2,870,893 | 1/1959 | Palm | 192—68 X |
| 3,218,828 | 11/1965 | Thelander | 192—107 X |

MARK M. NEWMAN, *Primary Examiner.*

A. T. McKEON, *Assistant Examiner.*

UNITED STATES PATENT OFFICE
CERTIFICATE OF CORRECTION

Patent No. 3,352,393                          November 14, 1967

W. Vincent Thelander

It is hereby certified that error appears in the above numbered patent requiring correction and that the said Letters Patent should read as corrected below.

Column 4, line 38, strike out "and"; line 40, after "thereto" insert a comma.

Signed and sealed this 17th day of December 1968.

(SEAL)
Attest:

Edward M. Fletcher, Jr.                         EDWARD J. BRENNER
Attesting Officer                               Commissioner of Patents